Nov. 18, 1958  J. R. GREGOR ET AL  2,860,961
METHOD FOR MAKING ABRASIVE ARTICLES
Filed April 5, 1955  2 Sheets-Sheet 1
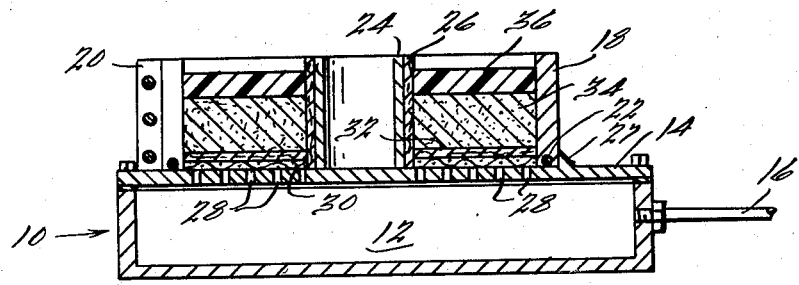
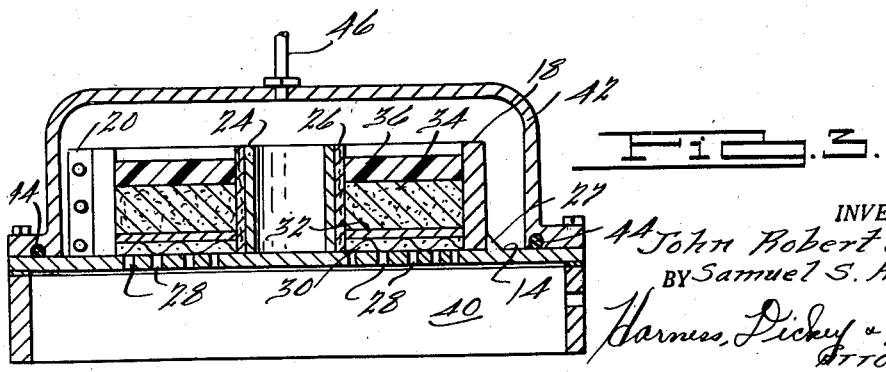
INVENTORS.
John Robert Gregor
BY Samuel S. Kistler
Harness, Dickey & Pierce
ATTORNEYS Nov. 18, 1958     J. R. GREGOR ET AL     2,860,961
METHOD FOR MAKING ABRASIVE ARTICLES
Filed April 5, 1955
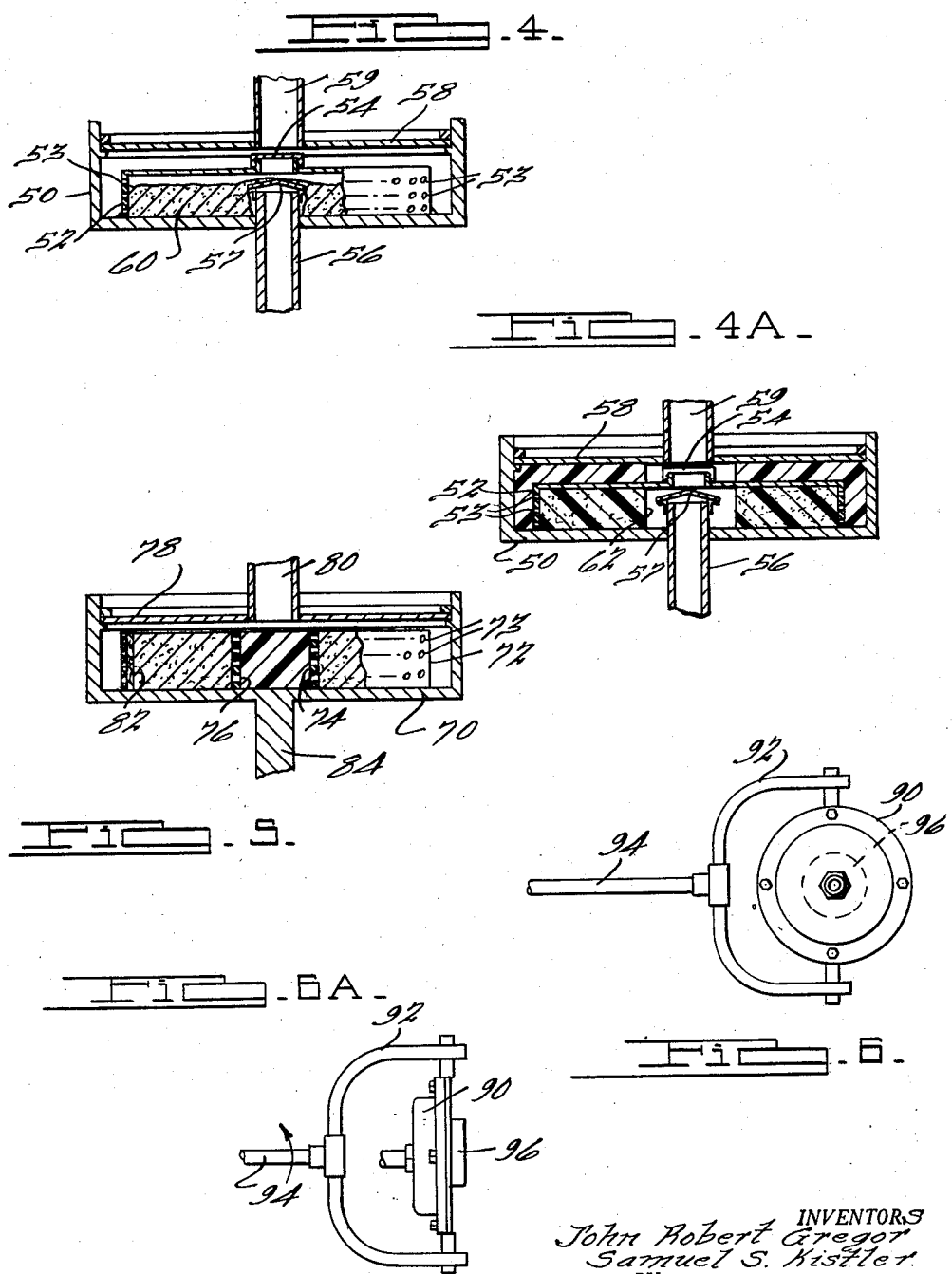
INVENTORS
John Robert Gregor
Samuel S. Kistler
BY
Harness, Dickey & Pierce
ATTORNEYS

2,860,961
METHOD FOR MAKING ABRASIVE ARTICLES

John R. Gregor, Detroit, Mich., and Samuel S. Kistler, Salt Lake City, Utah, assignors to Abrasive and Metal Products Company, Detroit, Mich., a corporation of Michigan Application April 5, 1955, Serial No. 499,443

12 Claims. (Cl. 51—298)

The present invention relates to the art of making resin-bonded abrasive articles and more particularly to an improved process for making grinding wheels.

Resin-bonded abrasive articles are usually made by first wetting the abrasive grain with a liquid substance such as a solvent or plasticizer and then mixing the other ingredients of the bond or bonding material with these grains. Such mixing is usually carried out in conventional mixing apparatus. The resulting damp mixture is then pressed, either hot or cold, to produce a "green" abrasive article. Finally the "green" abrasive article is heated in an oven to cure the resin and other constituents of the bonding material.

In the pressing operation, pressures of 2 to 3 tons per sq. in. or more are conventionally employed. The resulting pressed wheels frequently have from 5 to 15 percent (by volume) of voids and seldom have less than 4 percent voids.

The pressing operation is thought to be undesirable because it may damage the abrasive grains themselves. The pressing may actually fracture some of the grains or produce an interface of fine powder along contiguous grain surfaces thereby greatly weakening the entire structure.

It is the primary object of the present invention to provide an improved method of making resin-bonded abrasive articles which overcomes the disadvantages which accompany press molding methods of forming abrasive articles.

Another object of this invention is to provide an improved method of making grinding wheels which produces wheels having less voids than is conventionally obtained by commercial manufacturing methods.

A further object of this invention is to provide a simplified method for producing abrasive articles which eliminates the steps of preliminarily coating the abrasive grains with a solvent or plasticizer before adding the other components of the bond and of pressing the bond-coated grains into the desired shape.

A still further object is to provide abrasive articles, and particularly grinding wheels, which are characterized by increased strength and higher grinding efficiency than is characteristic of comparable heretofore known abrasive articles.

In accordance with the present invention it has been discovered that abrasive articles having less voids than has been heretofore conventional can be produced by a method which comprises the steps of positioning dry abrasive grains in a mold having the desired shape, introducing a preliminarily mixed bond material to one exposed surface of the abrasive grains to form a continuous layer thereover and causing the layer of bond material to move through the grain layer toward an opposite surface of the grain layer so that the bond moves through the grain layer somewhat as a front displacing the air ahead of it and substantially completely filling the pores with the bond material, meanwhile preventing loss of bond material from the opposite surface when the bond mix has reached it and completely penetrated the grain layer. The penetrated grain layer is then heated to harden the bond. It will be apparent that this method eliminates the conventionally employed steps of wetting the grains with a solvent or plasticizer, mixing the wetter grains with the other components of the bond, and the operation of pressing the coated grains into the desired shape. The resulting abrasive articles produced by the improved method of this invention have the general appearance of those which are made by techniques employing pressure but they are characterized by having a low percentage of voids and a higher grinding efficiency than have heretofore known pressure-shaped abrasive articles.

The critical portion of the above generally described method resides in the step of obtaining uniform displacement of air throughout the abrasive grains and substantially complete filling of the voids therebetween. It has been found that the bond material should be applied to the abrasive layer in a substantially uniform layer covering an entire exposed surface of the grains and provision made for the removal or escape of air from the side of the grain layer opposite the bond layer. When this is done the layer can be caused to move through the grain layer in a uniform manner displacing air ahead of it which is removed or escapes at an opposite surface. When this is done entrapment of air and channeling are substantially eliminated. Likewise, as stated above, provision should be made for preventing escape or loss of bond material from the opposite side of the grain layer not only to prevent loss but also to eliminate channeling. It has been found that a barrier layer, of a material which is readily pervious to air but which resists penetration by a liquid or fluid bond because of the higher viscosity of the latter, on the side of the grain layer opposite the bond layer will permit ready removal or escape of air and will effectively prevent escape or loss of the bond material. In some cases, centrifugal force may be employed to prevent loss of bond material, as will be more fully described below.

The bond mix may be caused to penetrate the grain layer in a directional manner by applying a pressure differential across the layers of bond and abrasive grains, or by utilizing the force of gravity or centrifugal force to cause a directional movement of the bond. The pressure differential across the layers may be established by applying a vacuum to a side of the grain layer opposite the bond layer, or by applying a positive pressure over the bond layer to force it through the abrasive layer toward an opposite surface. Centrifugal force may be employed to cause a radial movement of a bond layer from an interior surface of the grain layer to an opposed outer surface, or a directional movement of a bond layer to an opposite surface, for example, in a mold which is swung on gimbals on a rotating arm. In any of these methods of establishing the desired directional flow of bond, a barrier layer will prevent leaking through, sucking through, blowing through, or centrifugal loss of bond material. Centrifugal force may be employed to accelerate a layer of bond material moving toward an exterior surface of a grain layer, the accelerated layer is then deflected back through the grain layer toward an opposed interior surface, the centrifugal force causing both layers to equalize themselves at the interior surface of the grain layer. In the latter case the force of centrifugal motion performs a function similar to that of the barrier layer. In all of these manners of causing a directional movement of the bond layer it is important to provide the bond material with a consistency such that it is capable of easy application to the surface of the grain layer to form a continuous layer and yet is sufficiently mobile to readily flow into and fill the voids of the grain layer under the force being applied.

In the practice of the method of this invention the particular materials which are utilized may be any of the conventionally employed abrasive grains, bonds of the resin type, fillers, etc. Abrasive articles may be made from silicon carbide, boron carbide, tantalum carbide, tungsten carbide or other hard metal carbides; alumina such as emery and including electric furnace fused alumina such as corundum, diamond grains, glass, quartz, garnet, etc. Any of the conventional filler materials such as powdered cryolite, feldspar, iron oxide and others which are inert and which improve cutting efficiency may be employed satisfactorily. If desired, the bond compositions may also contain lime, and where furfuraldehyde is employed, the presence of lime is recommended.

The resin to be used in the bond must be curable, heat hardenable or heat convertible to a hard, strong bond. As above indicated, the bond mix should be of a suitable fluidity. Hence, the resin in admixture with the fillers and other ingredients forming the bond, must be liquid or liquifiable at the temperatures employed so that complete penetration and filling of the pores may be obtained and it must attain sufficient hardness and high strength. Of the various resins having these necessary characteristics it has been found that the phenol- or cresol-aldehyde resins are most suitable for the purpose of this invention. Phenol-formaldehyde condensation products of the standard "Bakelite" type in powdered or liquid form have been found to be unusually satisfactory when employed in this method. If desired these phenol-aldehyde resins may be modified with small quantities of other resinous materials such as epoxy resins, vinyl resins including vinyl chloride, vinyl butyral, vinyl formal, vinyl acetate and others and may contain varying percentages of cross-linking aids such as hexamethylene tetramine or paraformaldehyde and suitable solvents or plasticizers such as furfuraldehyde and propylene sulfite. Other plasticizers such as cresol, furfuryl alcohol, or the like may be employed if desired.

To obtain uniform filling of the pores of the article, and in order to obtain reproducible results from article to article in production, it has in some cases been found desirable to preliminarily heat the mold and the abrasive grains prior to the application of the bond material to the abrasive grains positioned in the mold. The bond material also may be preheated before application to the grains, for example, to a temperature in the range of 130–260° F. and preferably in the range of 165° F. to about 220° F. The grains and the mold may be heated in the range from slightly higher than room temperature (i. e. about 80 to 90° F.) to about 350° F., and in some cases preferably to approximately the same temperature as that of the preheated bond. In certain other instances it is more desirable to heat the grains to a higher temperature than the temperature of the bond and in still other instances the grain temperature may more advantageously be somewhat lower than the temperature of the bond, depending upon the particular composition and curing characteristics of the bond which is being employed.

The viscosity of the bond mix material is of some importance since the material should form a continuous layer and be capable of flow when applied to the grains. It has been found that the maximum viscosity which can be conveniently formed into such a layer, and which can be caused to penetrate a grain layer in a reasonable time, is about 20,000 centipoises (cps.). When applied to preheated grains, the viscosity of the mix should not be appreciably above this figure. The minimum viscosity which can be handled is about 500 cps. When solid powdered resin binders are employed the mix should have a viscosity not appreciably higher than that obtained when about 200 ml. of furfuraldehyde, or its equivalent, is admixed with one pound of a typical powdered A-stage phenol-formaldehyde resin. An unusually advantageous set of conditions which is suitable for the production of grinding wheels is to heat the bond to a temperature below that at which it will cure rapidly, for example, from 165° F. to about 180° F. for a bond mix containing hexamethylene tetramine hardener, heating the grain and mold to a temperature well above the curing temperature of the resin, for example, 200 to 350° F., rapidly applying a layer of the bond to the grain and forcing it down through the voids while preventing the escape of bond from the grain layer by means of the barrier. The high grain temperature momentarily produces a higher fluidity in the applied bond layer which enables its ready penetration and more uniform filling of the pores, but shortly after the pores are filled the bond material starts to thicken and harden due to cure and this hardening provides early rigidity in the bond and freedom from flow to permit removal of the abrasive article from the mold.

The abrasive articles which may be suitably formed by using the steps of this invention may in general contain from about 54 to about 64% by volume of abrasive and from about 36 to 46% by volume of the bonding material. As noted above, the bonding material may contain various amounts of binder resins, fillers, plasticizers and other additives. An illustrative abrasive article may contain from about 54 to about 64% by volume of abrasive, 16 to 26% by volume of binder resin or resins, 1 to 4% by volume of lime, 8 to 20% of a filler such as cryolite, and from 0 to 200 ml. of furfuraldehyde for each pound of powdered phenol-aldehyde resin, if the latter type is employed. In addition, small quantities of hexamethylene tetramine, paraformaldehyde, and other auxiliary cross-linking agents or hardeners may be employed.

In the accompanying drawings there is illustrated several forms of apparatus for carrying out the method of this invention. Figure 1 is a vertical section through a vacuum mold assembly for use in this invention showing the screen, barrier, abrasive grains and bond mix in position before application of vacuum, the section being taken along line 1—1 of Fig. 2; Fig. 2 is a plan view of the apparatus of Fig. 1; Fig. 3 is a sectional view, similar to Fig. 1, but showing a form of apparatus as modified for the use of pressure; Fig. 4 is a sectional view of a spinning mold with abrasive grains partially filling the inner mold member; Fig. 4a is a view similar to Fig. 4 but showing the mold during spinning and after the addition of bond is complete; Fig. 5 is a sectional view of a spinning mold adapted for addition of the bond to the center arbor; Fig. 6 is a plan view of a gimbal supported mold; and Fig. 6a is a plan view of the mold of Fig. 6 during the rotation of the arm.

The apparatus of Figs. 1 and 2 is designed for the use of vacuum to assist the displacement movement of the bond layer and comprises a mold base plate 10 having a vacuum chamber 12, a foraminous top plate 14 and a vacuum connection 16. On top of the base plate 10 there is disposed a circular, split band outer mold member 18 having a pair of outwardly-projecting flaps 20 which can be secured by bolts to form a continuous circle. The band can be made of lightweight, fairly flexible sheet metal since it is not subjected to high pressures in use. The plate 14 or the band 18 is provided with an O-ring seal 22 to establish a vacuum-tight connection therebetween. Concentric within the band 18 is an upstanding core 24 which forms the hole in the wheel. The core can be permanently anchored in plate 14 or be removable therefrom. Alternatively, the core could be an arbor intended to be permanently molded into the wheel. As shown, the core 24 is re-usable and is provided with a fiber layer or collar 26 to prevent adhesion of the bond material. The split ring mold 18 is positioned on plate 14 by several abutments 27 positioned on plate 14.

The annular area of the foraminous plate 14 is provided with a plurality of fine holes 28 to effect a connection with the vacuum chamber 12. Over the holes 28 there is placed a fairly coarse wire retainer screen ring 30 and on top of the screen there is placed a ring 32 of barrier material such as cardboard chip stock. The abrasive grain layer 34 is placed directly on top of the barrier ring 32 and a continuous layer 36 of bond mix placed directly on top of the grain layer. Vacuum applied to the chamber 12 assists the sinking or flooding action of the bond material and the air displaced from the voids of the grain layer is sucked downwardly through the barrier 32 to the holes 28 where it is removed by the vacuum.

In use the mold band is first assembled, placed on the plate, the core put in position, the screen and barrier layer put in position, the abrasive grains poured into the mold (along with any metal safety rings required), and the continuous bond layer poured in place. Vacuum then is applied to chamber 12. When penetration is somplete the vacuum is broken and the mold plate, mold and its contents placed in an oven for cure.

The barrier ring 32, as stated above, should be constructed of a material which is pervious to air but which is substantially impervious to, or which will resist penetration by, the bond mix. Such a material is a cardboard-like material known as cardboard chip stock. Other materials which may be utilized include certain grades of filter paper, and the like. The barrier ring may be discarded after one use if it adheres to the abrasive layer, or if the bond mix penetrates it to any extent and lower its permeability to air. The quantity of bond mix applied to the surface of the grains should be adjusted to an amount which is at least equal to the volume of voids in the layer. When this proper minimum amount is applied it is possible to form a complete or continuous layer over the abrasive. Moreover, when this is done, the vacuum may be broken when the continuous layer of bond first begins to disappear from the top surface of the grain layer since this is reliable indication of complete penetration of the layer of abrasive grains. An excess of bond may be employed, if desired, the excess being removed from the finished wheel before use, if necessary.

Alternatively, the plate, ring mold and the unbonded abrasive layer may first be placed in a preheating oven. When the mold and its contents has reached the desired preheat temperature, the bond layer is poured in (bond may also be preheated) and vacuum or pressure applied. The sensible heat of the mold and of the abrasive grains cause the bond layer to flow into the grain layer with greater speed and uniformity and the curing reaction is soon instituted so that the bond mix begins to harden. The vacuum may be broken as soon as penetration is substantially complete and the assembly allowed to stand, if necessary, until the bond material has partially hardened. The split ring mold may then be opened, the partially hardened abrasive article or wheel removed from the plate (a removable core would facilitate handling of the wheel at this stage) and placed in an oven to complete the cure of the bond. The plate and split ring may then be reassembled before they have lost all their preheat, the assembly reheated if necessary, and one or more additional partially hardened wheels made while cure of the preceding wheels is being completed. In commercial operations such a procedure would reduce the number of molds required and cut down preheat fuel requirements. Such an operation also could be made more or less automatic, for example, by employing a plurality of conveyorized molds, if desired.

The apparatus of Fig. 3 is for use in the pressure technique. The foraminous plate 14, split-ring outer mold 18, core 24, barrier 32, and other details are similar to those of Figs. 1 and 2. However, the vacuum chamber 12 has been replaced with an open stand 40 and a pressure cap, bell or cover 42 placed over the entire mold and over an O-ring 44 and clamped to the upper surface of plate 14 by bolts, clamps, etc. Air or steam pressure introduced under the cover through line 46 will exert a pressure on the top of the bond layer forcing it to penetrate the grain layer with greater speed. As before, the bond material moves through the grain layer with a sweeping, frontal or displacing action, forcing the air in the voids ahead of it. The front of fluid bond mix displaces air ahead of it, the displaced air passing through the barrier 32 and escaping from the mold through the holes 28 in the plate 14. When penetration is complete it will be found that the barrier layer has retained the bond mix and the pressure may be released, the cover 42 removed, and the plate and the mold placed in an oven to harden the bond. As before, preheating the mold, grains and/or the bond mix would produce a partially hardened abrasive wheel which could be removed from the mold for cure in an oven.

In Figs. 4, 4a and 5, two types of spinning molds are more or less diagrammatically illustrated. In Fig. 4 the mold comprises an outer mold member 50 having an inner mold member 52 positioned and held against movement on its inner bottom surface. The inner mold member 52 has a plurality of holes 53 distributed in its outer peripheral surface and a filler cap 54 removably secured at the center of its upper surface. The outer mold member 50 is mounted on a hollow shaft 56 so as to be capable of being rapidly spun in a horizontal plane. Positioned and secured in spaced relation over the inner mold member 52 is a top plate member 58 having a filler spout 59. The inner mold 52 is partially filled with loose unbonded abrasive grains 60 by pouring through the filler cap 54 so that when the cap is replaced and the mold is rapidly rotated the loose grains will flow outwardly to assume the shape of a wheel 62 (Fig. 4a) inside member 52, leaving a hole in its interior around the area of the shaft 56. After a preliminary spinning period the addition of bond mix is started by pouring through the spout 59. The bond will move radially over the top surface of the inner mold to fill the annular space between mold members 50, 52. As bond addition is continued the acceleration imparted to the added bond forces the material in the outer annular space to flow through the holes 53 of mold member 52 and through the grain layer toward the center of the mold. The air in the voids of the grain layer is displaced by this directional flow and can escape through the annular center hole in the grain layer and pass out of the mold through hollow shaft 56. As shown, the hollow shaft 56 is continued up into the inner mold space and provided with a deflector 57 to deflect abrasive poured through cap 54. Addition of bond is continued until the bond accumulates on top of the inner mold member or interior surface of the grain layer shows it to be wetted. Discontinuing bond addition while continuing the spinning for a time causes the excess bond in the radial space between upper plate 58 and inner mold member 52 to equalize at the inner surface of the penetrated grain layer 62 without further substantial loss of bond material. Considerable control over the speed of penetration can be exercised by the rate of spinning and the rate of bond addition. If desired, an injection device can be employed to deliver a measured charge of fluid bond to the upper surface of inner mold member 52.

In the mold of Fig. 5 an outer mold member 70 is provided with an inner mold member 72 positioned therein and having a center arbor 74 having holes 76 in its side. The inner mold member 72 has holes 73 in its outer surface for escape of air. A top cover or plate 78 can be provided having a filler spout 80 through which bond is added to the interior of the arbor 74. The arbor should be filled to a depth at least as great as the depth of the grain layer. Around the inside periphery of inner mold member 72 a barrier ring 82 of cardboard chip stock or other suitable material is provided to prevent loss of bond. When the mold is set in spinning motion on shaft 84 the bond mix in the arbor will flow radially toward the holes 73 in the outer periphery of member 72 displacing air ahead of it. Displaced air can escape from the grain layer through the barrier and holes 73 and from the mold by passing out spout 80. Bond addition is continued until the level in arbor 74 no longer decreases, at which point the grain layer will have been completely filled.

The mold 90 of Figs. 6 and 6a can be similar in general details to that of Fig. 3 but it is rotatably suspended in gimbals 92 attached to an arm 94 which can be rapidly rotated. When this is done the mold rotates in the gimbals to assume a vertical position such as is shown in Fig. 6a, a weight 96 being attached to the bottom of the mold, if necessary, to insure correct positioning of the mold in the arm during rotation. Since the bond mix layer is superimposed on top of the grain layer as in Fig. 3, centrifugal force will force the bond mix to move in a direction radially of the arm and through the grain layer to the bottom of the mold until it strikes the barrier ring or layer 32. Air displaced ahead of the bond layer passes through the barrier and out of the mold through the holes 28.

In any of the spinning or rotational methods described above it is particularly advantageous to preheat the mold and grains and/or the bond mix so that hardening of the bond will soon rigidify the grain layer to permit early cessation of spinning or rotation and the early removal of an at least partially hardened abrasive from the mold.

The invention will now be described in greater detail in connection with the specific examples to follow. Unless otherwise specified proportions are expressed as percent by volume.

*Example 1*

In this example a large, heavy duty grinding wheel 24″ in diameter, 3″ thick and having an arbor of 12″ was prepared by the vacuum displacement technique. The apparatus employed was similar to that of Figs. 1 and 2. The split band mold was first assembled and placed on the foraminous plate. The core was then wrapped in fiber and placed in position at the center of the plate. Then a ring-shaped, coarse wire screen was placed over the vacuum holes in the plate and a ring of air permeable cardboard chip stock laid on the screen. A mixture of Nos. 10, 12, 14 and 16 aluminum oxide abrasive grains was next poured into the split band mold along with three metal safety rings arranged in the grain layer and spaced in the conventional manner. Lastly, the top surface of the grain layer was then leveled off. The completed assembly was then placed in an air oven and treated to a temperature of between 200 and 210° F.

A bond mix was prepared by mixing the following materials on a volume basis:

| | |
|---|---|
| Powdered A-stage phenol-formaldehyde resin [1] | 47 |
| Powdered cryolite | 24 |
| Powdered lime | 7 |
| Furfuraldehyde [2] | 22 |
| | 100 |

[1] "Bakelite 0222."
[2] Equivalent to 160 cc./lb. of resin.

The bond mix was first warmed to about 180° F. and then poured over the preheated abrasive so as to form a continuous layer over the entire exposed surface of the abrasive layer. The mix was of a somewhat reduced viscosity at 180° F. and when placed on the warmer abrasive was observed to undergo a further reduction of viscosity. A vacuum of 28″ of mercury was then applied to the chamber of the plate. The bond mix was observed to gradually sink into the grains in a uniform manner. After an interval of about 2.5 minutes the bond layer was adjudged to have completely penetrated and filled the void spaces of the grain layer. After the vacuum was broken, the mold and plate assembly was placed in an air oven and baked in a conventional manner to complete the hardening of the bond. The baked wheel was then removed from the mold and the adhering fiber and other surface irregularities cut off and its cutting edge faced or smoothed off. The finished wheel weighed 110.5 lbs. and had a density of .1047 lb. per cubic inch. On examination the wheel was found to be sound and satisfactory in every way.

A similar wheel was made in a somewhat similar manner in which the mold and grains were preheated to a temperature of about 250° F. A shorter period of vacuum application was sufficient to complete the penetration of the grains due to the higher sensible heat of the grains. After standing for a short interval at atmospheric pressure after penetration was complete, the wheel was observed to have hardened considerably. It was then removed from the mold and placed in an air oven to complete the baking operation. The resulting abrasive wheel was equivalent to a similar wheel baked in the mold.

A bond mix found to be equally satisfactory in either of the procedures of Example 1 was one in which the furfuraldehyde was replaced by 26% by volume of propylene sulfite, or about 185 cc. of this material for every pound of powdered phenolic resin.

*Example 2*

In this example a liquid phenol-formaldehyde resin having a viscosity at 25° C. of 14,000 cps. and known commercially as "Durez 14021" was employed in place of the powdered phenolic resin of the preceding example to produce a wheel 12″ O. D., 2″ I. D. and 1.5″ thick. Before incorporating in the bond mix the liquid resin was combined with hexamethylene tetramine ("hexa") in the proportions of 9 parts resin to 1 part of the amine. A bond mix, which was somewhat thinner than the liquid resin itself, was prepared by mixing at room temperature the following materials:

| | |
|---|---|
| Durez 14021 (9 resin/1 "hexa") | 55 |
| Cryolite | 30 |
| Furfuraldehye [1] | 10 |
| Lime | 5 |

[1] Equivalent to 80 cc./lb. of liquid resin.

In this case, bond mix was applied to a mold similar to that of Fig. 3 at room temperature, the mold and abrasive grains also being at room temperature. No pressure or vacuum was applied, the bond layer being allowed to flood down through the mix to displace the air in the voids of the grain layer through a barrier layer of cardboard chip stock. Since the proportion of bond was about 40% by volume and the abrasive about 60% by volume there was sufficient of the bond to form a continuous layer of considerable thickness over the grain layer. Penetration by flooding was complete in about five minutes. The mold was then placed in an air oven at 200 to 250° F. to bake the bond. A homogeneous, substantially void-free abrasive wheel of excellent strength was obtained.

*Example 3*

In this example a bond mix consisting of 65% by volume of "Durez 14021" liquid phenolic resin (9 resin/1 "hexa"), 30% cryolite and 5% lime was employed to make a wheel of the type of Example 2. This mix was somewhat more viscous than that of Example 2. The mix, however, was preheated to 180° F. (just below point at which "hexa" begins to break down), at which temperature it was of about the same viscosity as that of the preceding example, and poured as a continuous layer over an abrasive grain layer in a mold set up such as that of Figs. 1 and 2, the mold and grains again being at room temperature. A vacuum of 26″ Hg was then applied to the mold plate through a barrier of cardboard chip stock for about 45 seconds at which point the displacement of air was believed complete. The vacuum was then broken, the mold placed in an oven and the wheel baked. The wheel was found to be completely sound, high in density and satisfactory in all ways.

Example 4

A wheel 12" in diameter, 1.5" thick and having a 2" arbor was molded in an apparatus similar to that of Fig. 3. The bond mix was that of Example 1, containing 47% by volume of powdered phenolic resin and 22% by volume of furfuraldehyde. The abrasive grains were placed in the assembled mold, the mold and grain layer preheated to 200–210° F., and the bond mix, preheated to 180° F., poured over the abrasive to form a continuous layer. An airtight bell or cover was placed over the mold and fastened to the plate. Air pressure, 60 lbs./sq. in. gage, was then applied to the bell for a period of one minute. The bond material was found to have completely penetrated the grain layer. After the pressure was released, the mold plate, mold and the penetrated grain layer were placed in an oven and baked to complete the hardening of the bond. The resultant wheel was found to be completely sound (density-.1042 lbs./cu. in.) and satisfactory in appearance. When speed tested to destruction, a speed of 26,000 surface feet per second was required to destroy the wheel.

Example 5

Wheels of the foregoing types prepared by the vacuum displacement technique and gravity displacement technique of this invention were compared to control wheels as to their destruction strength, wheel wear and weight of steel removed in grinding under standard pressure, and grinding efficiency (ratio-weight lost by steel: weight lost by wheel). The control wheels were of the same size and were prepared by the conventional cold pressing method from the same materials. The wheels were tested by grinding steel under a weight of 150 lbs. on the chain of a standard abrasive wheel tester. The data are set forth below:

| Wheel No. | Method of Manufacture | Destruction Speed, S. F. P. M. | Wheel Wear, lbs./hr. | Steel Removed, lbs./hr. | Efficiency, S/W. W. |
|---|---|---|---|---|---|
| 1 | Cold press | 26,430 | 6.60 | 44.40 | 6.73 |
| 2 | do | 26,490 | 6.96 | 44.16 | 6.34 |
| 3 | do | 27,540 | 6.60 | 46.92 | 7.11 |
| 4 | Vacuum | 26,833 | 3.96 | 33.85 | 8.54 |
| 5 | do | 27,405 | 5.05 | 41.00 | 8.13 |
| 6 | do | 27,000 | 4.88 | 41.40 | 8.48 |
| 7 | Gravity | 25,500 | 5.51 | 54.80 | 9.90 |
| 8 | do | 25,000 | 4.44 | 46.44 | 10.42 |

From the above data it is readily apparent that abrasive wheels made by either the gravity displacement or the vacuum-assisted displacement techniques of this invention produce wheels which are as sound as those produced by the conventional high pressure hot or cold pressing methods. The wheel wear of the displacement wheels, however, was from 16 to 43% below that of the cold pressed wheels. At the same time the weight of steel removed was of the same order, or slightly greater than that obtained with the cold pressed wheels. As a result, the cutting efficiency of the wheels was increased by 14 to 65%. Such improvements in the wear of the wheel and its cutting efficiency makes possible a significant reduction in abrasive wheel expense in such heavy grinding uses as snagging in the steel industry or trim grinding in the foundry industry. Moreover, the displacement method of this invention is less expensive than the pressing methods since it cuts down on the number of processing steps, the need for heavy presses and their heavy, expensive molds, and makes possible a higher production from a given number of molds.

Example 6

An abrasive wheel is made in the apparatus of Figs. 4 and 4a employing a preheated fluid bond mix similar to that of Example I. The correct amount of loose, preheated (200–250° F.) abrasive grains is first added to the inner mold and the mold spun rapidly to form a wheel inside the mold. Addition of bond mix is then commenced with the addition of a considerable quantity sufficient to rapidly fill the annular space between the inner and outer mold members and between the inner mold and the upper plate. Bond mix is then added in a small continuous stream until the bond mix is observed to accumulate on the upper surface of the inner mold member. Addition of bond is then terminated and the mold allowed to spin until hardening of the bond is believed sufficiently advanced for the arbrasive layer to hold its shape. The inner mold is then removed from the outer mold and placed in an oven to complete the cure. Upon removal of the finished wheel blank from the mold, its arbor or center area is cleaned out and the wheel faced off. The resultant finished wheel is sound and has a low percentage of voids.

The present invention is a continuation-in-part of co-pending application, Serial No. 417,173, filed March 18, 1954.

What is claimed is:

1. A method of making abrasive articles which comprises placing a quantity of unbonded abrasive grains in a mold in contact with an air permeable, liquid bond-impermeable barrier layer to thus form a grain layer, introducing a liquid bond mix containing a thermosetting binder resin to the exposed side of said grain layer so as to form a continuous bond layer thereover, applying a pressure differential across the said grain and said bond layers to thereby expel air from said grain layer through said barrier and to force said bond into the interstices of said grain layer, and thereafter hardening the said bond.

2. A method as defined in claim 1 and further characterized in that the mold and layer of grains are preheated before the layer of bond mix is applied thereto.

3. A method of making abrasive articles which comprises placing a quantity of loose abrasive grains in a mold, preheating said mold and grains to a temperature in the range of 80 to 350° F., covering an entire exposed surface of the layer of grains in said mold with a continuous layer of a bond mix containing a thermosetting phenol-aldehyde binder resin having a viscosity in the range of 500–20,000 centipoises, the bond layer containing at least sufficient material to substantially fill the voids in the grain layer, applying a vacuum to the side of the grains opposite said bond layer through an air permeable barrier layer resistant to penetration by the bond to draw air out the grain layer and, after penetration of the grains is complete, heating the bond-filled grain layer to form a hardened abrasive article.

4. A method as defined in claim 3 and further characterized in that said mold and abrasive grains are preheated to a temperature in the range recited which is above the temperature where cure of the binder resin begins and said abrasive grains are removed from said mold when the layer of grains has been filled and the bond has been partially hardened to a degree permitting removal, and the partially hardened grain layer is thereafter heated outside the mold to complete the hardening of said bond mix.

5. A method as defined in claim 3 and further characterized in that said bond mix is preheated to a temperature in the range of 165° to about 220° F. before application to said grains.

6. A method as defined in claim 3 and further characterized in that both the mold and its layer of abrasive grains and the bond mix are preheated to approximately the same temperature in the range recited before being combined.

7. A method of making abrasive articles in accordance with claim 1 wherein said pressure differential is obtained by centrifugal force.

8. A method of making abrasive wheels which comprises placing a layer of loose abrasive grains in a mold in contact with an air permeable, liquid bond-impermeable barrier layer to thus form a grain layer, preheating said mold and its contents to a temperature above room temperature but not more than 350° F., preheating a bond mix including a powdered, thermosetting, A-stage phenol-formaldehyde binder resin admixed with about 200 ml. of furfuraldehyde per pound of said powdered resin to a temperature in the range of 130° to about 260° F., placing a continuous layer of said preheated bond mix over the exposed surface of the layer of preheated grains in said mold, the said layer of bond mix containing at least sufficient material to substantially fill the voids in said grain layer, applying a pressure differential across the said grain and said bond mix layers to thereby expel air from said grain layer through said barrier and to force said bond into the interstices of said grain layer, and removing said grains from said mold when said bond mix has become sufficiently hardened by the sensible heat of the grains for handling.

9. A method of making abrasive wheels which comprises placing a layer of loose abrasive grains in a mold, preheating a bond mix including a powdered, A-stage phenol-formaldehyde binder resin admixed with about 200 ml. of furfuraldehyde per pound of said powdered resin to a temperature in the range of 130° to 260° F., applying a continuous layer of said preheated bond mix over the entire exposed surface of the layer of grains in the mold, the proportion of said bond mix in said continuous layer being at least sufficient to substantially fill the voids in the grain layer, drawing a vacuum on the side of said grain layer opposite said bond layer through an air-permeable barrier resistant to penetration by the bond mix to cause said bond layer to move through the grain layer toward said opposite side displacing the air in the voids therein, and thereafter heating the bond-filled abrasive layer to harden the material of the bond.

10. A method of making abrasive wheels which comprises placing a layer of loose abrasive grains in a mold in contact with an air permeable liquid bond-impermeable barrier layer to thus form a grain layer, applying a continuous layer of a bond mix containing a B-stage phenol-formaldehyde binder resin having a viscosity in the range of 500 to 20,000 centipoises so as to cover the entire exposed upper surface of said abrasive layer, the proportion of said bond mix in said continuous layer being at least sufficient to substantially fill the voids in the grain layer, applying a pressure differential across the said grain and said bond mix layers to thereby expel air from said grain layer through said barrier and to force said bond into the interstices of said grain layer, and thereafter hardening the material of the bond in the grain layer.

11. The method of claim 9 in which the layer of abrasive grains is preheated to a temperature in the range of 80 to 350° F. before the bond layer is applied thereto.

12. The method of claim 8 wherein air pressure exceeding atmospheric pressure is applied over an exposed surface of the continuous bond layer to force it into the grain layer and air displaced from said abrasive layer is permitted to escape from the side of the grain layer opposite the bond layer through the said air-permeable barrier layer resistant to penetration by the bond mix.

References Cited in the file of this patent

UNITED STATES PATENTS

| | | |
|---|---|---|
| 1,826,300 | Chapell | Oct. 6, 1931 |
| 1,959,059 | McGill | May 15, 1934 |
| 2,084,534 | Martin et al. | June 22, 1937 |
| 2,218,795 | Kistler et al. | Oct. 22, 1940 |
| 2,333,429 | Kuymick | Nov. 2, 1943 |
| 2,469,398 | Meyer | May 10, 1949 |